(12) United States Patent
Sano

(10) Patent No.: US 9,128,279 B2
(45) Date of Patent: Sep. 8, 2015

(54) WAVELENGTH-TUNABLE INTERFERENCE FILTER, OPTICAL MODULE, AND OPTICAL ANALYSIS APPARATUS

(75) Inventor: Akira Sano, Shiojiri (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 13/216,509

(22) Filed: Aug. 24, 2011

(65) Prior Publication Data

US 2012/0050742 A1  Mar. 1, 2012

(30) Foreign Application Priority Data

Aug. 25, 2010  (JP) .................. 2010-188506

(51) Int. Cl.
| | |
|---|---|
| *G01N 21/25* | (2006.01) |
| *G01B 9/02* | (2006.01) |
| *G02B 26/00* | (2006.01) |
| *G01J 3/26* | (2006.01) |
| *G01J 3/46* | (2006.01) |
| *G01J 3/50* | (2006.01) |

(52) U.S. Cl.
CPC .............. *G02B 26/001* (2013.01); *G01J 3/26* (2013.01); *G01J 3/46* (2013.01); *G01J 3/50* (2013.01)

(58) Field of Classification Search
CPC ....... G02B 5/28; G02B 5/284; G02B 6/29361
USPC .......... 356/416, 454, 480, 506, 519; 359/484.09, 489.19, 588, 578, 579, 359/589; 257/2–5, 414–420; 438/102–104
See application file for complete search history.

(56) References Cited

U.S. PATENT DOCUMENTS

| | | | |
|---|---|---|---|
| 6,275,324 B1 | 8/2001 | Sneh | |
| 6,421,188 B1* | 7/2002 | Maehara | 359/741 |
| 6,590,710 B2* | 7/2003 | Hara et al. | 359/579 |
| 7,154,094 B2 | 12/2006 | Yokura et al. | |
| 7,349,136 B2 | 3/2008 | Chui | |
| 7,525,713 B2 | 4/2009 | Nakamura | |
| 7,630,114 B2* | 12/2009 | Wang et al. | 359/237 |
| 8,233,219 B2* | 7/2012 | Takada et al. | 359/588 |

(Continued)

FOREIGN PATENT DOCUMENTS

| | | |
|---|---|---|
| JP | 58-217901 | 12/1983 |
| JP | 08-254612 | 10/1996 |

(Continued)

OTHER PUBLICATIONS

Bucciarelli, Louis L., "Engineering Mechanics for Structures", Chapter 7, "Stresses: Beams in Bending", 2002, pp. 7.3-7.26.

*Primary Examiner* — Kara E Geisel
*Assistant Examiner* — Hina F Ayub
(74) *Attorney, Agent, or Firm* — Harness, Dickey & Pierce, P.L.C.

(57) ABSTRACT

A wavelength-tunable interference filter comprising a first substrate, a second substrate facing the first substrate, a first reflective film provided on the first substrate, a second reflective film provided on the second substrate, the second reflective film facing the first reflective film, a first electrode provided on the first substrate, and a second electrode provided on the second substrate, the second electrode facing the first electrode, wherein the first electrode includes a first electrode layer and a second electrode layer, the first electrode layer has a first in-plane internal stress which is compressive, and the second electrode layer has a second in-plane internal stress which is tensile.

26 Claims, 6 Drawing Sheets

(56) References Cited

U.S. PATENT DOCUMENTS

| | | |
|---|---|---|
| 2002/0061042 A1 | 5/2002 | Wang et al. |
| 2005/0018302 A1 | 1/2005 | Yano et al. |
| 2005/0100269 A1 | 5/2005 | Ishizuya et al. |
| 2006/0222821 A1 | 10/2006 | Masai |
| 2006/0245056 A1 | 11/2006 | Lin |
| 2007/0242920 A1* | 10/2007 | Lin et al. .................. 385/27 |
| 2008/0186508 A1 | 8/2008 | Kiesel et al. |
| 2008/0246389 A1 | 10/2008 | Meincke et al. |
| 2010/0103522 A1 | 4/2010 | Matsumoto |
| 2010/0142067 A1 | 6/2010 | Hanamura et al. |
| 2011/0019202 A1* | 1/2011 | Iwaki et al. .................. 356/519 |
| 2012/0008097 A1 | 1/2012 | Okamuro et al. |
| 2012/0050869 A1* | 3/2012 | Nishimura et al. ........... 359/589 |
| 2012/0092666 A1* | 4/2012 | Meijer et al. .................. 356/326 |
| 2012/0127482 A1 | 5/2012 | Tanemura et al. |

FOREIGN PATENT DOCUMENTS

| | | |
|---|---|---|
| JP | 11-142752 | 5/1999 |
| JP | 2004-004547 A | 1/2004 |
| JP | 2005-043755 A | 2/2005 |
| JP | 2005-083794 A | 3/2005 |
| JP | 2005-215323 A | 8/2005 |
| JP | 2005-279831 A | 10/2005 |
| JP | 2005-308968 A | 11/2005 |
| JP | 2006-286971 A | 10/2006 |
| JP | 2006-349775 A | 12/2006 |
| JP | 2007-219483 A | 8/2007 |
| JP | 2008-116669 | 5/2008 |
| JP | 2009-217138 A | 9/2009 |
| JP | 2009-251105 | 10/2009 |
| JP | 2009-258406 A | 11/2009 |
| JP | 2012-108371 | 6/2012 |
| JP | 2012-112777 | 6/2012 |
| WO | WO-2010-069497 A1 | 6/2010 |

* cited by examiner

WAVELENGTH-TUNABLE INTERFERENCE FILTER, OPTICAL MODULE, AND OPTICAL ANALYSIS APPARATUS

BACKGROUND

1. Technical Field

The present invention relates to a wavelength-tunable interference filter that selects light with a desired wavelength from incident light to output it, an optical module having the wavelength-tunable interference filter, and an optical analysis apparatus having the optical module.

2. Related Art

In the related art, there is a wavelength-tunable interference filter that emits light with a desired wavelength by generating multi-interference of light between a pair of reflection films (for example, refer to JP-A-2009-251105).

The optical filter apparatus (wavelength-tunable interference filter) disclosed in JP-A-2009-251105 has a first substrate and a second substrate, each of which is provided with a movable mirror and a fixed mirror on the facing surface.

In the first substrate, the movable mirror is provided in a first portion at the center of the substrate, and a second portion having flexibility with a thickness dimension smaller than that of the first portion is provided on the outer periphery of the first portion. In addition, a first electrode is provided on the surface of the second portion of the first substrate facing the second substrate, and a second electrode facing the first electrode with a predetermined distance is provided on the surface facing the first electrode of the second substrate.

In such a wavelength-tunable interference filter, if a voltage is applied between the first and second electrodes, the second portion of the first substrate is bent toward the second substrate due to an electrostatic attractive force so that a gap dimension varies between the movable mirror and the fixed mirror. As a result, the wavelength-tunable interference filter can extract light with a wavelength corresponding to the gap dimension between the mirrors from the incident light by controlling a voltage between the first and second electrodes.

In the wavelength-tunable filter as disclosed in JP-A-2009-251105, the first electrode is provided in the second portion of the first substrate having flexibility. Although a film-shaped electrode is used as the first electrode, an internal stress is applied in an in-plane direction of the film (a direction along the surface of the first substrate) when such a first electrode is formed. The direction or the size of the internal stress is determined based on a film formation method or a film material. In addition, when the internal stress is applied to a direction toward the center of the film, a compressive stress is applied. When the internal stress is applied to the outer side from the center of the film of the first electrode, a tensile stress is applied. Here, when a compressive stress is applied to the first electrode formed in the first substrate, the first substrate is bent toward the second substrate. When a tensile stress is applied to the first electrode formed in the first substrate, the first substrate is bent to a direction far from the second substrate.

As such, if the first substrate is bent due to the internal stress of the first electrode, the movable reflective film is also bent in response to the bending of the substrate, the movable reflective film and the fixed reflective film may not be maintained in parallel, compared to the initial state in which a drive voltage is not applied between the first and second electrodes, so that the resolution of the wavelength-tunable interference filter may be degraded.

SUMMARY

An advantage of some aspects of the invention is to provide a wavelength-tunable interference filter, an optical module, and an optical analysis apparatus capable of preventing bending of the substrate.

According to an aspect of the invention, there is provided a wavelength-tunable interference filter including: a first substrate; a second substrate facing the first substrate; a first reflective film provided on a surface of the first substrate facing the second substrate; a second reflective film that is provided on a surface of the second substrate facing the first substrate and faces the first reflective film by interposing a gap; a first electrode provided on a surface of the first substrate facing the second substrate; and a second electrode that is provided on a surface of the second substrate facing the first substrate and faces the first electrode by interposing a gap, wherein the first electrode is formed by stacking a compressive electrode layer in which a direction of an internal stress with respect to an in-plane direction along a surface of the first substrate is a compressive direction and a tensile electrode layer in which a direction of the internal stress is a tensile direction.

In the configuration, the first electrode provided in the first substrate is configured by stacking the compressive electrode layer having a compressive stress and the tensile electrode layer having a tensile stress. Here, a force to bend the first substrate toward the second substrate is exerted by means of the compressive stress of the compressive electrode layer, and a force to bend the first substrate away from the second substrate is exerted by means of the tensile stress of the tensile electrode layer. Therefore, since each force is exerted in opposite directions, the forces are cancelled by each other so that the force to bend the first substrate is reduced. As a result, since the bending of the first substrate is reduced, it is possible to reduce also the bending of the first reflective film provided on the first substrate, improve a parallel relationship between the first reflective film and the second reflective film with high precision, and improve resolution of the wavelength-tunable interference filter.

When the wavelength-tunable interference filter is manufactured, a gap dimension between the first reflective film and the second reflective film is set to a setup value (initial gap dimension) during an initial state in which no drive voltage is applied between the first and second electrodes. In this case, when bending exists in the first substrate, there is a problem in that the gap dimension may not be accurately set to the initial gap dimension. In contrast, according to the aspect of the invention, since bending of the first substrate is reduced, it is possible to match the gap between the first and second reflective films with the initial gap dimension with high precision.

In the wavelength-tunable interference filter according to the aspect of the invention, it is preferable that an absolute value of a product between the film thickness dimension and the internal stress of the compressive electrode layer be equal to an absolute value of a product between the film thickness dimension and the internal stress of the tensile electrode layer.

Here, the force applied by the internal stress of the film formed on the substrate to the substrate is proportional to the product between the film thickness dimension and the magnitude of the internal stress of the film. Here, if the area of the compressive electrode layer included in the first electrode is equal to the area of the tensile electrode layer, and an absolute value of a product between the film thickness dimension and the magnitude of the compressive stress of the compressive electrode layer is equal to an absolute value of a product between the film thickness dimension and the magnitude of the tensile stress of the tensile electrode layer, the force exerted by the compressive electrode layer to the first substrate and the force exerted by the tensile electrode layer to the first substrate are balanced, so that the bending of the first substrate caused by the internal stress of the first electrode is prevented. As a result, it is possible to maintain the first reflective film and the second reflective film in parallel, and further improve resolution of the wavelength-tunable interference filter.

In the wavelength-tunable interference filter according to the aspect of the invention, it is preferable that the compressive electrode layer be a metal oxide film, and the tensile electrode layer be a metal film.

Generally, in a case where a subsequent process such as annealing is not performed after the film is formed, the metal oxide film is apt to have a compressive stress, and the metal film is apt to have a tensile stress. Therefore, if the metal oxide film is used in the compressive electrode layer, and the metal film is used in the tensile electrode layer according to the aspect of the invention, it is not necessary to perform a post-process for determining the direction of the internal stress after each electrode layer is formed, and it is possible to easily form the first electrode capable of reducing bending of the first substrate.

Here, in the wavelength-tunable interference filter according to the aspect of the invention, it is preferable that the first substrate be formed of glass, and the layer being in contact with the first substrate of the first electrode be the compressive electrode layer.

In the wavelength-tunable interference filter, it is preferable that the first substrate be formed of glass having optical transmittance in a case where visible light or ultraviolet light is spectroscopically dispersed. In this case, since the electrode layer abutting on the first substrate of the first electrode is used as the compressive electrode layer of the metal oxide film, it is possible to improve adhesiveness between the first substrate and the compressive electrode layer and the adhesiveness between the first substrate and the first electrode.

In the wavelength-tunable interference filter according to the aspect of the invention, it is preferable that the first substrate include a movable portion having a first reflective film and a retaining portion that retains the movable portion to allow the movable portion so as to move back and forth with respect to the second substrate, wherein stiffness in a thickness direction of the retaining portion is smaller than that of the movable portion, and the first electrode is provided in the retaining portion.

In the configuration, the first substrate includes a movable portion and a retaining portion that retains the movable portion, and the retaining portion is provided with the first electrode. In such a wavelength-tunable interference filter, since the stiffness with respect to a thickness direction of the retaining portion is smaller than that of the movable portion, the retaining portion can be easily bent by applying a low voltage between the first and second electrodes. In this case, since the stiffness of the movable portion is larger than that of the retaining portion, it is possible to prevent bending of the movable portion and the first reflective film even when the retaining portion is bent. That is, it is possible to change the gap between the first and second reflective films by applying a lower voltage (a smaller electrostatic attractive force) in comparison with a configuration in which the retaining portion is not provided, and reduce power consumption. Meanwhile, since it is possible to prevent bending of the movable portion, it is possible to improve a parallel relationship between the first and second reflective films with high precision. Meanwhile, the retaining portion having such weak stiffness is easily influenced by the internal stress of the first electrode. However, according to the aspect of the invention, since the compressive electrode layer and the tensile electrode layer are provided in the first electrode as described above, the force exerted by such an internal stress of the electrode layer to the retaining portion of the first substrate is cancelled, so that it is possible to prevent bending of the retaining portion.

Therefore, it is possible to suppress reduction of resolution even when a wavelength of the light emitted from the wavelength-tunable interference filter is changed by bending the first substrate.

In the wavelength-tunable interference filter according to the aspect of the invention, it is preferable that the second substrate be a fixed substrate that is not deformed by an electrostatic attractive force exerted by applying a voltage to the first electrode and the second electrode, and an insulation film covering a surface of the second electrode facing the first substrate be provided on the second electrode.

In the configuration, since the insulation film is provided on the second electrode, it is possible to prevent a leakage caused by electrical discharge generating between the first and second electrodes. Therefore, a desired amount of electric charges corresponding to the established drive voltage are held in the first and second electrodes, and it is possible to set a gap between the first and second reflective films to a desired dimension.

Here, since the second substrate is a fixed substrate having stiffness that is not bent by the electrostatic attractive force, the internal stress of the second electrode, or the like, the second substrate is not bent by the internal stress of the insulation layer even when the insulation layer is provided, and it is possible to maintain a parallel relationship between the first and second reflective films with high precision.

According to another aspect of the invention, there is provided an optical module including: a wavelength-tunable interference filter described above; and a detection unit that detects light transmitting through the wavelength-tunable interference filter.

In the configuration, since bending of the first substrate or the first reflective film caused by the internal stress of the first electrode is reduced in the wavelength-tunable interference filter as described above, it is possible to improve a parallel relationship between the first and second reflective films with high precision and realize high resolution. Therefore, in the optical module having such a wavelength-tunable interference filter, since light with a desired wavelength extracted with high resolution can be received by the detection unit, it is possible to accurately detect the amount of light having a desired wavelength.

According to still another aspect of the invention, there is provided an optical analysis apparatus including: an optical module described above; and an analysis processing unit that analyzes an optical property of light based on light received by the detection unit of the optical module.

Here, the optical analysis apparatus may include an optical measurement apparatus that analyzes chromaticity or brightness of light incident to an interference filter based on the amount of light detected by the optical module described above, a gas detection apparatus that inspects the type of the gas by detecting an absorption wavelength of the gas, an optical communication apparatus that obtains data included in a wavelength of light from the received light, and the like.

In the configuration, since the accurate amount of light having a desired wavelength can be detected using the optical module as described above, an analysis processing unit of the optical analysis apparatus can perform an accurate optical analysis process based on such accurate data.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

1. Entire Configuration of Colorimetric Apparatus

Figure 1:
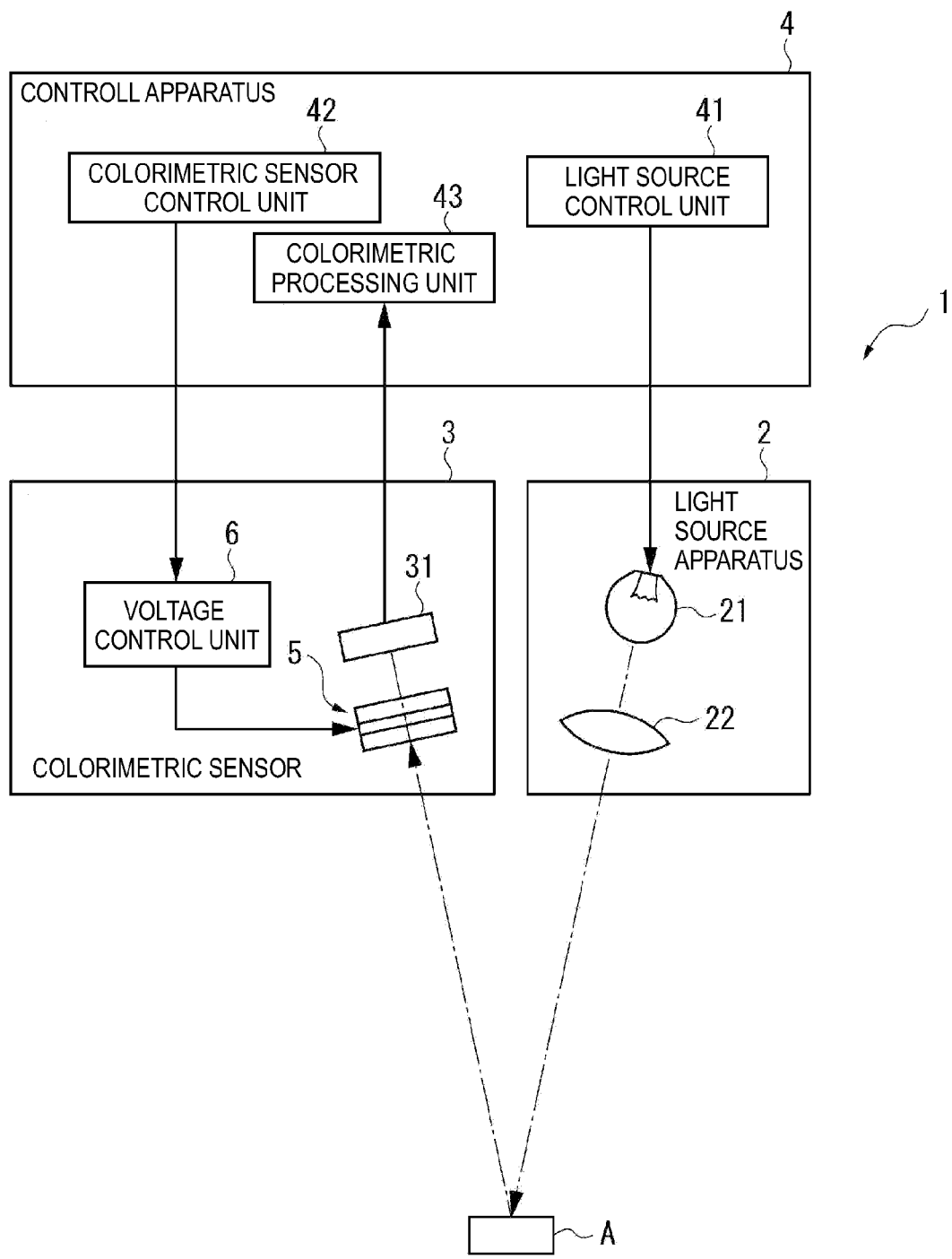
FIG. 1 is a diagram illustrating a schematic configuration of the colorimetric apparatus according to an embodiment of the invention.

FIG. 1 is a diagram illustrating a schematic configuration of the colorimetric apparatus (optical analysis apparatus) according to an embodiment of the invention.

The colorimetric apparatus 1 is an optical analysis apparatus according to the invention, and includes a light source apparatus 2 which emits light to an inspection target A, a colorimetric sensor 3 as an optical module according to the invention, and a control apparatus 4 which controls overall operations of the colorimetric apparatus 1 as shown in FIG. 1. In the colorimetric apparatus 1, the light emitting from the light source apparatus 2 is reflected at the inspection target A, the reflected inspection target light is received by the colorimetric sensor 3, and chromaticity of the inspection target light, that is, the color of the inspection target A is analyzed based on the detection signal output from the colorimetric sensor 3 to be measured.

2. Configuration of Light Source Apparatus

The light source apparatus 2 has a light source 21 and a plurality of lenses 22 (only a single lens is shown in FIG. 1) to emit white light to the inspection target A. A plurality of lenses 22 may include a collimator lens. In this case, the light source apparatus 2 makes the white light beams emitted from the light source 21 be parallel using the collimator lens and emits the paralleled light beams from a projection lens (not shown) to the inspection target A.

Although a colorimetric apparatus 1 having a light source apparatus 2 is exemplarily illustrated in the present embodiment, for example, the light source apparatus 2 may not be provided if the inspection target A is a light-emitting member such as a liquid crystal panel.

3. Configuration of Colorimetric Sensor

The colorimetric sensor 3 is included in the optical module according to the invention. As shown in FIG. 1, the colorimetric sensor 3 includes an etalon 5 as a wavelength-tunable interference filter according to the invention, a detection unit 31 which receives and detects the light transmitting through the etalon 5, and a voltage control unit 6 which changes the wavelength of the light transmitting through the etalon 5. In addition, the colorimetric sensor 3 includes an incidence optical lens (not shown), which guides the reflection light (inspection target light) reflected at the inspection target A to the inner side, at the position facing the etalon 5. In addition, in such a calorimetric sensor 3, only light with a predetermined wavelength is spectroscopically dispersed of the inspection target light incident from the incidence optical lens using the etalon 5 and received by the detection unit 31.

The detection unit 31 includes a plurality of photoelectric conversion elements and generates an electric signal corresponding to the received light amount. In addition, the detection unit 31 is connected to the control apparatus 4 and outputs the generated electric signal as a received-light signal to the control apparatus 4.

3-1. Configuration of Etalon

Figure 2:
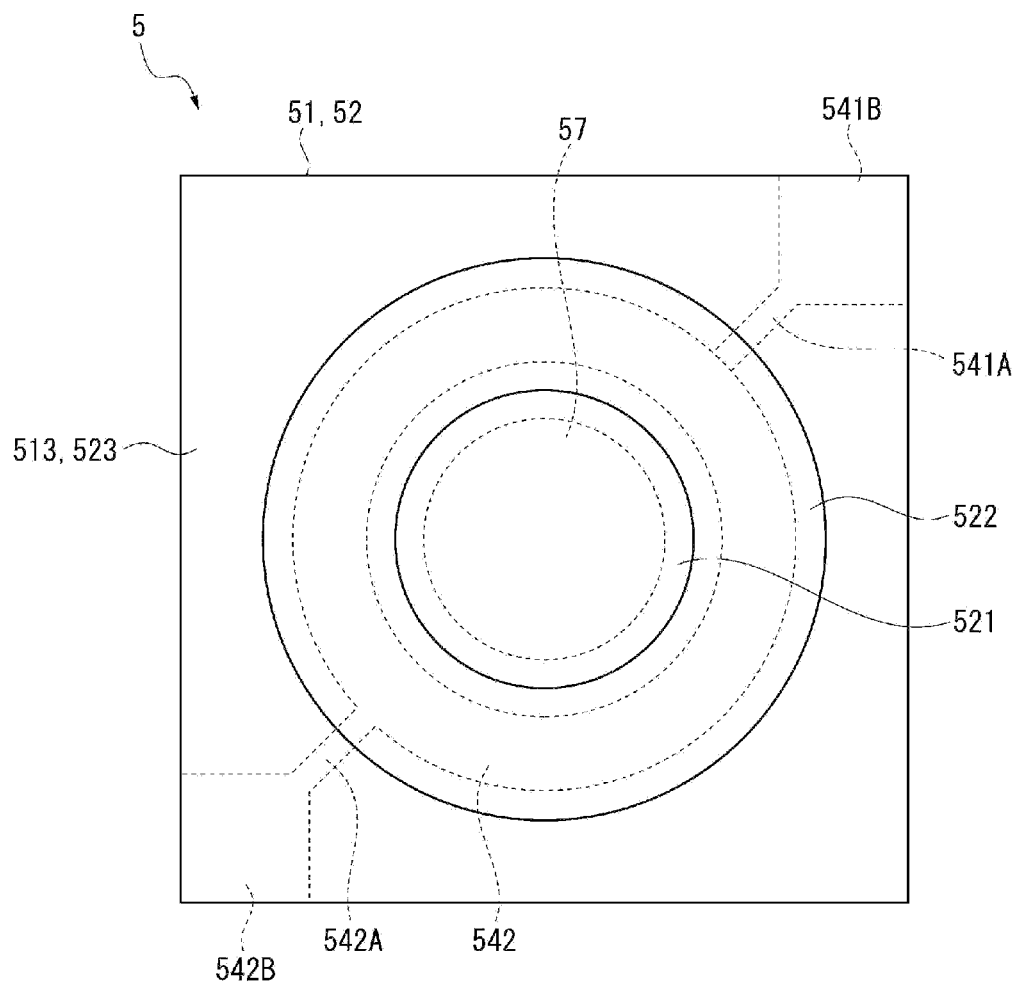
FIG. 2 is a plan view illustrating a schematic configuration of the etalon as a wavelength-tunable interference filter according to an embodiment of the invention.
Figure 3:
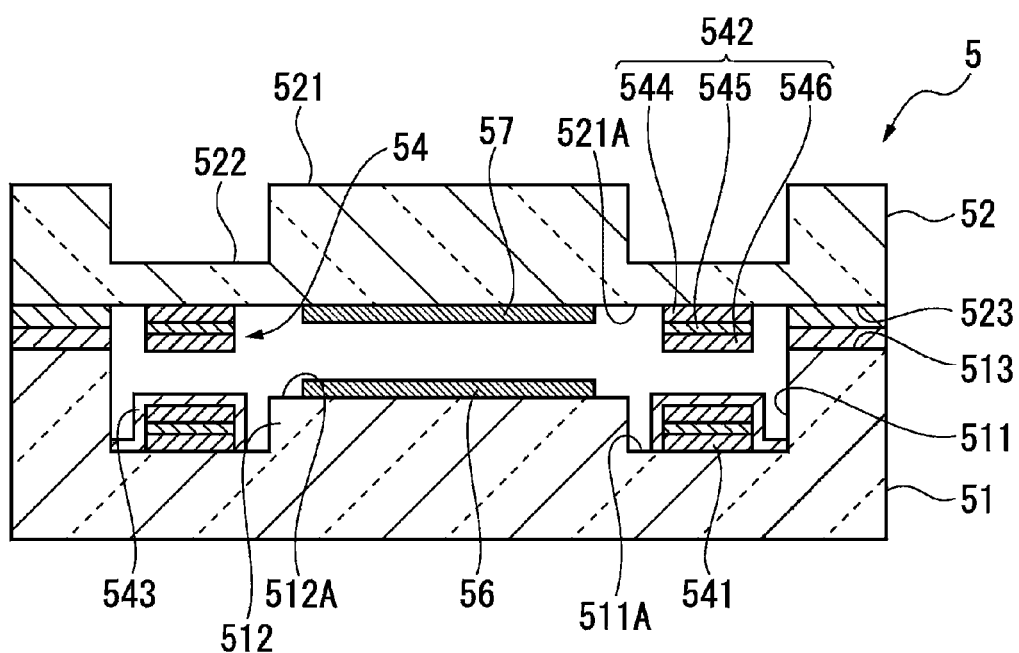
FIG. 3 is a cross-sectional view illustrating a schematic configuration of the etalon according to an embodiment of the invention.

FIG. 2 is a plan view illustrating a schematic configuration of the etalon 5 included in the wavelength-tunable interference filter according to the invention. FIG. 3 is a cross-sectional view illustrating a schematic configuration of the etalon 5.

As shown in FIG. 2, the etalon 5 is a square plate-shaped optical member as seen in a plan view as shown in FIG. 2, and each side thereof has a length of, for example, 10 mm. As shown in FIG. 3, the etalon 5 includes a fixed substrate 51 as the second substrate according to the invention and a movable substrate 52 as the first substrate according to the invention. Such a pair of substrates 51 and 52 are made of, for example, various kinds of glass such as soda glass, crystalline glass, silica glass, lead glass, potassium glass, borosilicate glass, alkali-free glass, crystal, and the like. In addition, such a pair of substrates 51 and 52 are bonded together into a single body by bonding the bonding portions 513 and 523 formed near the outer periphery, for example, through room-temperature activation bonding, siloxane bonding using plasma-polymerized film, and the like.

The fixed substrate 51 is provided with a fixed reflective film 56 included in the second reflective film according to the invention, and the movable substrate 52 is provided with a movable reflective film 57 included in the first reflective film according to the invention. Here, the fixed reflective film 56 is fixed to the surface of the fixed substrate 51 facing the movable substrate 52, and the movable reflective film 57 is fixed to the surface of the movable substrate 52 facing the fixed substrate 51. In addition, the fixed reflective film 56 and the movable reflective film 57 are arranged to face each other by interposing a gap therebetween.

Furthermore, an electrostatic actuator 54 for adjusting a dimension of the gap between the fixed reflective film 56 and the movable reflective film 57 is provided between the fixed substrate 51 and the movable substrate 52. The electrostatic actuator 54 includes a fixed electrode 541 as the second electrode according to the invention provided in the fixed substrate 51 side and a movable electrode 542 as the first electrode according to the invention provided in the movable substrate 52 side.

3-1-1. Configuration of Fixed Substrate

The fixed substrate 51 is formed by fabricating a glass member formed to have a thickness of, for example, 500 μm. Specifically, as shown in FIG. 3, an electrode formation groove 511 and a reflective film fixation unit 512 are formed on the fixed substrate 51 through etching. Since the fixed substrate 51 is formed to be larger than the movable substrate 52 in a thickness dimension, an electrostatic attractive force caused by the voltage applied between the fixed electrode 541 and the movable electrode 542 or bending of the fixed substrate 51 caused by the internal stress of the fixed electrode 541 is rarely generated.

The electrode formation groove 511 is formed to have a circular shape with respect to the center of the plane as seen in a plan view from a thickness direction of the etalon 5 (hereinafter, referred to as an etalon plan view) as shown in FIG. 3. The reflective film fixation unit 512 is formed to protrude toward the movable substrate 52 from the center of the electrode formation groove 511 as seen in the aforementioned plan view.

In addition, the fixed substrate 51 is provided with a pair of extraction formation grooves (not shown) extending from the electrode formation groove 511 toward an apex of the outer edge of the fixed substrate 51 (for example, lower left and upper right directions in FIG. 2).

In addition, a ring-shaped fixed electrode 541 is formed on the electrode formation surface 541A as a bottom of the electrode formation groove 511 of the fixed substrate 51. The fixed electrode 541 includes a plurality of electrode layers. According to the present embodiment, the fixed electrode 541 is configured by sequentially stacking indium tin oxide (ITO), Cr, and Au from the electrode formation surface 511A.

A fixed extraction electrode 541A is also provided, which extends along a pair of the extraction formation grooves (the upper right direction in FIG. 2) from the outer edge of the fixed electrode 541. A fixed electrode pad 541B is formed in the leading end of the fixed extraction electrode 541A and connected to the voltage control unit 6. The fixed extraction electrode 541A is formed simultaneously when the fixed electrode 541 is formed. Similarly to the fixed electrode 541, the fixed extraction electrode 541A is configured by sequentially stacking a plurality of electrode layers (such as ITO, Cr, and Au).

In addition, an insulation film 543 is stacked on the fixed electrode 541 to prevent discharge between the fixed electrode 541 and the movable electrode 542. For example, the insulation film 543 is made of a member having an electrical insulation property, such as $SiO_2$, and covers a surface of the fixed electrode 541 facing the movable substrate 52 and a surface of the fixed extraction electrode 541A on the electrode formation surface 511A facing the movable substrate 52. In addition, the insulation film 543 may be formed to cover the overall remaining area other than the fixed electrode pad 541B of the fixed extraction electrode 541A.

The thickness dimension of the insulation film 543 may be set according to, but not limited to, a necessary dielectric strength voltage immunity.

The reflective film fixation unit 512 is formed to have a cylindrical shape having a diameter dimension smaller than that of the electrode formation groove 511 on the same axis as that of the electrode formation groove 511 as described above. In the present embodiment, as shown in FIG. 3, the reflective film fixation surface 512A of the reflective film fixation unit 512 facing the movable substrate 52 is exemplarily formed to be more adjacent to the movable substrate 52 in comparison with the electrode formation surface 511A. However, the invention is not limited thereto. The heights of the electrode formation surface 511A and the reflective film fixation surface 512A may be appropriately set based on a gap dimension between the fixed reflective film 56 fixed to the reflective film fixation surface 512A and the movable reflective film 57 formed in the movable substrate 52, a dimension between the fixed electrode 541 and the movable electrodes 542 formed in the movable substrate 52 as described below, and the thickness dimension of the fixed reflective film 56 or the movable reflective film 57. For example, in a case where the thickness dimension increases when the dielectric multilayer film is used as the reflective films 56 and 57, the electrode formation surface 511A and the reflective film fixation surface 512A may be formed on the same surface, or a cylindrical hollow-shaped reflective film fixation groove may be formed at the center of the electrode formation surface 511A so that the reflective film fixation surface 512A is formed on the bottom surface of the reflective film fixation groove.

However, the electrostatic attractive force applied between the fixed electrode 541 and the movable electrode 542 is inverse proportional to the square of the distance between the fixed electrode 541 and the movable electrode 542. Therefore, as the distance between the fixed electrode 541 and the movable electrode 542 becomes closer, the electrostatic attractive force for the applied voltage increases, and a variation amount of the gap increases. Particularly, in a case where a variable gap dimension is small (for example, 250 to 450 nm) as in the etalon 5 of the present embodiment, it is difficult to control the gap. Therefore, even when the reflective film fixation groove is formed as described above, it is preferable that the electrode formation groove 511 have a certain level of the depth dimension. According to the present embodiment, the electrode formation groove 511 has, for example, a depth of 1 μm.

In addition, in the reflective film fixation surface 512A of the reflective film fixation unit 512, it is preferable that the groove depth be designed in consideration of the wavelength range capable of transmitting through the etalon 5. For example, in a case where setup is made such that the movable reflective film 57 can be displaced until the gap becomes, for example, 250 nm by setting an initial value of the gap between the fixed reflective film 56 and the movable reflective film 57 (the gap dimension while no voltage is applied between the fixed electrode 541 and the movable electrode 542) to 450 nm, and applying a voltage between the fixed electrode 541 and the movable electrode 542, the thicknesses of the fixed reflective film 56 and the movable reflective film 57 and the height dimension of the reflective film fixation surface 512A or the electrode formation surface 511A may be set to values such that the gap G can be displaced between 250 to 450 nm.

In addition, a circular-shaped fixed reflective film 56 is fixed to the reflective film fixation surface 512A. The fixed reflective film 56 may be formed of a metal monolayer film or a dielectric multilayer film. In addition, the fixed reflective film 56 may be formed of Ag alloy on the dielectric multilayer film. The metal monolayer film may include, for example, an Ag alloy monolayer film. The dielectric multilayer film may include, for example, a dielectric multilayer film containing $TiO_2$ as a high refractive-index layer and $SiO_2$ as a low refractive-index layer. Here, in a case where the fixed reflective film 56 is formed using a metal monolayer such as an Ag alloy monolayer, it is possible to form a reflective film capable of covering the entire range of the visible light as a wavelength range allowing for spectroscopical dispersion using the etalon 5. In addition, in a case where the fixed reflective film 56 is formed of a dielectric multilayer film, it is possible to provide excellent resolution since transmittance of the dispersed light is high, and the half maximum full-width of the transmittance is narrow, while the wavelength range allowing for spectroscopical dispersion using the etalon 5 is narrower than that of the Ag alloy monolayer film.

In addition, in the fixed substrate 51, an anti-reflection film (AR) (not shown) is formed at a position corresponding to the fixed reflective film 56 on the lower surface opposite to the upper surface facing the movable substrate 52. The anti-reflection film is formed by alternately stacking a high-refractive index film and a low-refractive index film to reduce the reflectivity of the visible light and increase the transmittance on the surface of the fixed substrate 51.

3-1-2. Configuration of Movable Substrate

The movable substrate 52 is formed by etching a glass member having a thickness of, for example, 200 μm.

Specifically, the movable substrate 52 has a circular movable portion 521 centered at the center of the substrate as seen in a plan view of FIG. 2 and a retaining portion 522 for retaining the movable portion 521 on the same axis as that of the movable portion 521.

The movable portion 521 has a thickness dimension larger than that of the retaining portion 522. For example, according to the present embodiment, the movable portion 521 has a thickness dimension of 200 μm which is the same as that of the movable substrate 52. In addition, the movable portion 521 has a movable surface 521A in parallel with the reflective film fixation unit 512, and the movable reflective film 57 facing the fixed reflective film 56 by interposing a gap therebetween is fixed to the movable surface 521A.

Here, as the movable reflective film 57, a reflective film having the same configuration as that of the fixed reflective film 56 described above is used.

In addition, in the movable portion 521, an anti-reflection film (AR) (not shown) is formed on the upper surface opposite to the movable surface 521A at the position corresponding to the movable reflective film 57. The anti-reflection film has the same configuration as that of the anti-reflection film formed in the fixed substrate 51 and is formed by alternately stacking the low-refractive index film and the high-refractive index film.

The retaining portion 522 is a diaphragm surrounding the circumference of the movable portion 521, and is formed to have a thickness dimension of 50 μm so that the stiffness in the thickness direction is smaller than that of the movable portion 521. For this reason, the retaining portion 522 is more easily bent in comparison with the movable portion 521, and can be bent toward the fixed substrate 51 by a small electrostatic attractive force. In this case, the movable portion 521 has a larger thickness and higher stiffness than those of the retaining portion 522. Therefore, even when a bending force is applied to the movable substrate 52 by the electrostatic attractive force, the movable portion 521 is rarely bent, and it is possible to prevent bending of the movable reflective film 57 formed in the movable portion 521.

A ring-shaped movable electrode 542 is formed on the surface of the retaining portion 522 facing the fixed substrate 51 by interposing a gap of approximately 1 μm from the fixed electrode 541.

As shown in FIG. 3, the movable electrode 542 includes a plurality of electrode layers.

Specifically, the movable electrode 542 is configured by sequentially stacking a first electrode layer 544, a second electrode layer 545, and a third electrode layer 526 over the surface of the movable substrate 52. Here, the first electrode layer 544 has a compressive stress by which a direction of the internal stress applied along the in-plane direction is a compressive direction directed from the outer edge of the first electrode layer 544 to the center of the layer. In addition, the second electrode layer 545 has a tensile stress by which a direction of the internal stress is a tensile direction directed from the center of the layer to the outer edge of the second electrode layer 545. Furthermore, the third electrode layer 546 is subject to a tensile stress. That is, the first electrode layer 544 constitutes a compressive electrode layer according to the invention, and the second electrode layer 545 and the third electrode layer 546 constitute a tensile electrode layer according to the invention.

More specifically, the first electrode layer 544 is formed by depositing a metal oxide film through sputtering. For example, the first electrode layer 544 according to the present embodiment includes indium tin oxide (ITO) having a thickness dimension of 100 nm. The first electrode layer 544 formed of metal oxide provides an excellent adhesion property with the movable substrate 52 formed of glass so that exfoliation between the movable substrate 52 and the movable electrode 542 can be prevented. In addition, the film formed of metal oxide has a compressive stress while the post-process is not performed when it is formed by sputtering.

In addition, the second and third electrode layers 545 and 546 are formed by depositing e a metal film through sputtering. For example, according to the present embodiment, Cr of 10 nm is formed as the second electrode layer 545, and Au of 100 nm is formed as the third electrode layer 546. Although the present embodiment exemplifies the movable electrode 542 including three layers of first, second, and third electrode layers 544, 545, and 546, the movable electrode 542 may include, for example, four or more electrode layers or only two electrode layers including, for example, a first electrode layer 544 (ITO) having a compressive stress and a third electrode layer 546 (Au) having a tensile stress. However, the third electrode layer 546 made of Au has a bad adhesion property with the first electrode layer 544 made of ITO and may be exfoliated when the third electrode layer 546 is stacked on the first electrode layer 544. In contrast, Cr has an excellent adhesion property with both ITO and Au. The aforementioned problem such as exfoliation can be avoided by providing the second electrode layer 545 made of Cr between the first electrode layer 544 and the third electrode layer 546.

Although the present embodiment exemplifies ITO having a compressive stress as the first electrode layer 544, other materials such as a metal oxide film may be used. The metal oxide film exerting a compressive stress when it is formed through sputtering may include, for example, IZO, ICO, IGO, IXO, IWO, and the like. Furthermore, the first electrode layer 544 may be formed of other materials such as diamond-like carbon (DLC) having conductivity without limiting to metal oxide.

Similarly, although the present embodiment exemplifies the second electrode layer 545 and the third electrode layer 546 made of Cr or Au having a tensile stress, other metal films may be used. The metal exerting a tensile stress when it is formed through sputtering may include, for example, Cu, Al, Ag, Ti, W, Mo, and the like.

Here, a force (bending moment) F applied by the movable electrode 542 for bending the movable substrate 52 can be expressed as the following Equation 1:

$$F \propto \sigma_0 \times t_0 = (\sigma_1 \times t_1) + (\sigma_2 \times t_2) + (\sigma_3 \times t_3) \tag{1}$$

where, $\sigma_0$ denotes an internal stress of the movable electrode 542 formed on the movable substrate 52, $t_0$ denotes a film thickness dimension of the movable electrode 542, $\sigma_1$ denotes an internal stress of the first electrode layer 544, $t_1$ denotes a film thickness dimension of the first electrode layer 544, $\sigma_2$ denotes an internal stress of the second electrode layer 545, $t_2$ denotes a film thickness dimension of the second electrode layer 545, $\sigma_3$ denotes an internal stress of the third electrode layer 546, and $t_3$ denotes a film thickness dimension of the third electrode layer 546.

In the above-defined Equation 1, when the force F becomes zero, it is possible to prevent bending of the movable substrate 52 caused by the internal stress of the movable electrode 542.

Here, since the internal stress of the first electrode layer 544 is a compressive stress, the internal stress $\sigma_1$ has a positive value. Since the internal stresses of the second and third electrode layers 545 and 546 are tensile stresses, the internal stresses $\sigma_2$ and $\sigma_3$ have negative values. Therefore, when $F=0$ ($\sigma_0 \times t_0 = 0$), the following Equation 2 can be established.

$$|\sigma_1 \times t_1| = |(\sigma_2 \times t_2) + (\sigma_3 \times t_3)| \qquad (2)$$

In the present embodiment, each of the electrode layers 544, 545, and 546 of the movable electrode 542 satisfies the relationship of the Equation 2. As a result, it is possible to prevent bending of the movable substrate 52 caused by the internal stress of the movable electrode 542.

In addition, a movable extraction electrode 542A is formed to extend from part of the outer edge of the movable electrode 542 to the outer circumferential direction. Specifically, the movable extraction electrode 542A is provided in a position facing the other extraction formation groove of a pair of extraction formation grooves formed in the fixed substrate 51, where the fixed extraction electrode 541A is not formed, when the etalon is seen in a plan view. In addition, the movable electrode pad 542B is formed in a leading end of the movable extraction electrode 542A and connected to the voltage control unit 6.

The movable extraction electrode 542A is formed simultaneously when the movable electrode 542 is formed, and has the same configuration as that of the movable electrode 542. Therefore, a force applied by the internal stress of the movable extraction electrode 542A to the movable substrate 52 becomes zero, and accordingly, there is no bending in the movable substrate 52.

3-2. Configuration of Voltage Control Unit

The voltage control unit 6 controls a voltage applied to the movable electrode 542 and the fixed electrode 541 of the electrostatic actuator 54 based on the control signal input from the control apparatus 4.

4. Configuration of Control Apparatus

The control apparatus 4 controls the entire operation of the colorimetric apparatus 1.

As such a control apparatus 4, for example, a general-purpose personal computer, a portable information terminal, a colorimetric-purpose dedicated computer, or the like may be used.

In addition, as shown in FIG. 1, the control apparatus 4 includes a light source control unit 41, a colorimetric sensor control unit 42, a colorimetric processing unit 43 constituting the analysis processing unit according to the invention, and the like.

The light source control unit 41 is connected to the light source apparatus 2. In addition, the light source control unit 41 outputs a predetermined control signal to the light source apparatus 2 based on, for example, a user's setup input, and emits white light having a predetermined level of brightness from the light source apparatus 2.

The colorimetric sensor control unit 42 is connected to the colorimetric sensor 3. In addition, the colorimetric sensor control unit 42 sets a wavelength of the light received by the colorimetric sensor 3 based on, for example, the user's setup input and outputs a control signal for detecting the amount of the received light having such a wavelength to the colorimetric sensor 3. As a result, the voltage control unit 6 of the colorimetric sensor 3 sets the voltage applied to the electrostatic actuator 54 based on the control signal such that only a wavelength of light desired by a user can be transmitted.

5. Method of Manufacturing Etalon

Next, a method of manufacturing the etalon 5 will be described with reference to the accompanying drawings.

5-1. Manufacturing of Fixed Substrate

First, a silica glass substrate having a thickness dimension of 500 μm as a material of the fixed substrate 51 is prepared, and both surfaces are accurately polished until the surface roughness Ra of the silica glass substrate becomes 1 nm or lower. In addition, a photoresist for forming the electrode formation groove 511 is coated on the surface facing the movable substrate 52 of the fixed substrate 51, and the coated photoresist is exposed and developed through a photolithographic technique to pattern the portions corresponding to the electrode formation groove 511.

Figure 4A:
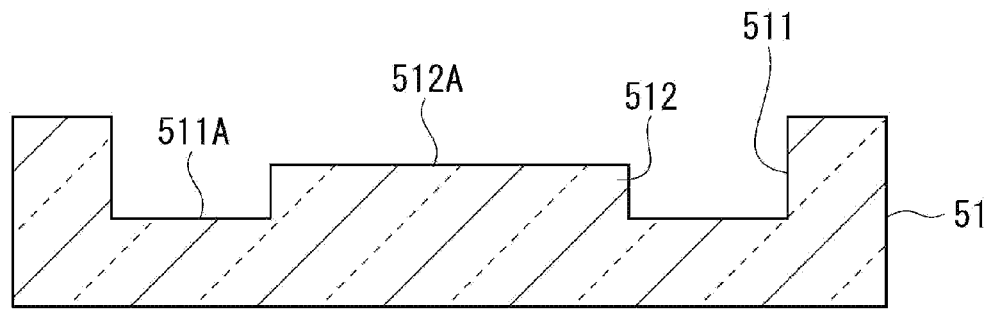
FIGS. 4A to 4D are diagrams illustrating a process of manufacturing a fixed substrate of the etalon according to an embodiment of the invention.

Then, through wet etching, the fixed substrate 51 is etched up to a depth dimension of the reflective film fixation surface 512A. Then, a photoresist is formed on the reflective film fixation surface 512A, and etching is further performed to form the electrode formation groove 511 as shown in FIG. 4A.

Figure 4B:
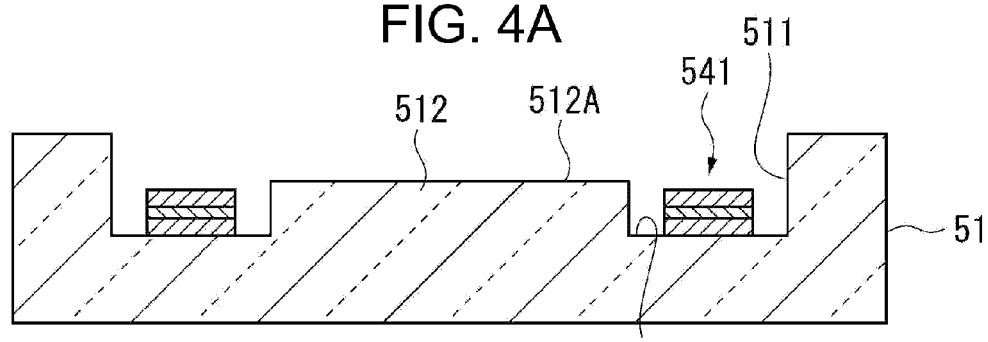

Next, an ITO film, a Cr film, and an Au film are sequentially stacked over the surface of the fixed substrate 51 facing the movable substrate 52 through sputtering so that a stack film is formed, and a pattern is formed through a photolithographic technique and etching. As a result, the fixed electrode 541 is formed as shown in FIG. 4B.

Figure 4C:
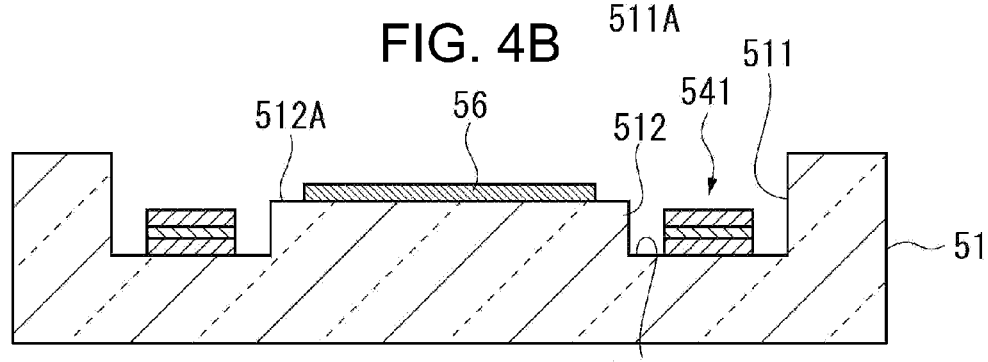

Then, a photoresist patterned to expose only the area corresponding to the fixed reflective film 56 on the reflective film fixation surface 512A is formed on the surface of the fixed substrate 51 facing the movable substrate 52 through a photolithographic technique, and the fixed reflective film 56 is formed through sputtering or a deposition technique. In addition, as shown in FIG. 4C, the fixed reflective film 56 is formed on the reflective film fixation surface 512A by removing the photoresist.

Subsequently, the insulation film 543 is formed on the surface of the fixed substrate 51 facing the movable substrate 52 through sputtering, a plasma CVD technique, and the like, and patterned through a photolithographic technique and etching.

Figure 4D:
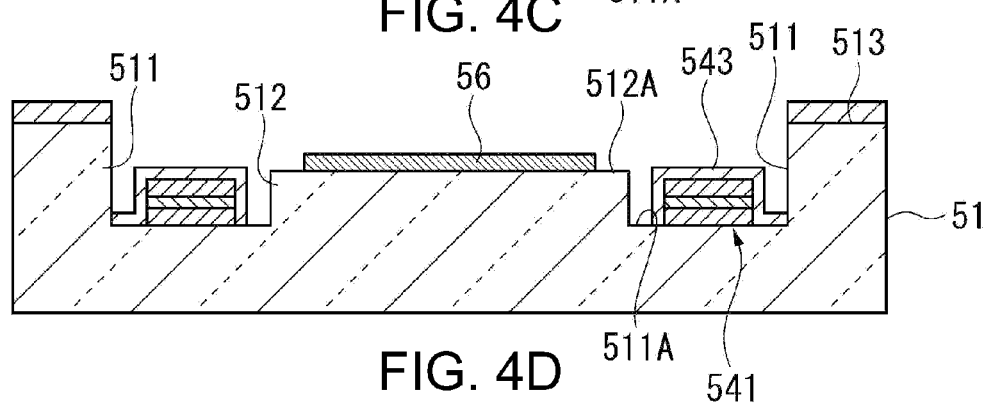

In addition, a photoresist patterned to expose only the area corresponding to the bonding portion 513 is formed on the fixed substrate 51, the plasma-polymerized film is formed using polyorganosiloxane through a plasma CVD technique, and the photoresist is removed through a lift-off technique. As a result, the fixed substrate 51 is formed as shown in FIG. 4D.

5-2. Manufacturing of Movable Substrate

In order to form the movable substrate 52, a condition for forming each electrode layer of the movable electrode 542 is set in advance, and an internal stress when each electrode layer 544, 545, and 546 is formed under such a condition is measured. For example, according to the present embodiment, the first, second, and third electrode layers 544, 545, and 546 are formed through sputtering. In this case, a condition for forming the first electrode layer 544 is set such that, for example, a film formation target substrate (movable substrate 52) has a temperature of 250° C., a pressure in a vacuum chamber is set to 0.5 Pa, and an electrical power applied to the target is set to 200 W, and the internal stress of the first electrode layer 544 formed under such a condition through sputtering is measured. In addition, a condition for forming the second and third electrode layers 545 and 546 is set such that, for example, the film formation target substrate has a room temperature (20° C.), a pressure in the vacuum chamber is set to 0.2 Pa, and an electric power applied to the target is set to 200 W, and the internal stresses of the second and third electrode layers 545 and 546 formed under such a condition through sputtering are measured.

In addition, the thickness dimensions of each electrode layer 544, 545, and 546 satisfying the Equation 2 are determined through simulation. Here, through the simulation, the thickness dimension of the first electrode layer 544 is determined as 100 nm, the thickness dimension of the second electrode layer 545 is determined as 10 nm, and the thickness dimension of the third electrode layer 546 is determined as 100 nm.

Figure 5A:
FIGS. 5A to 5D are diagrams illustrating a process of manufacturing a movable substrate of the etalon according to an embodiment of the invention.

Then, as a material for manufacturing the movable substrate 52, a silica glass substrate having a thickness dimension of 200 µm is prepared, and both surfaces are accurately polished until the surface roughness Ra of the glass substrate becomes 1 nm or lower as shown in FIG. 5A.

Figure 5B:
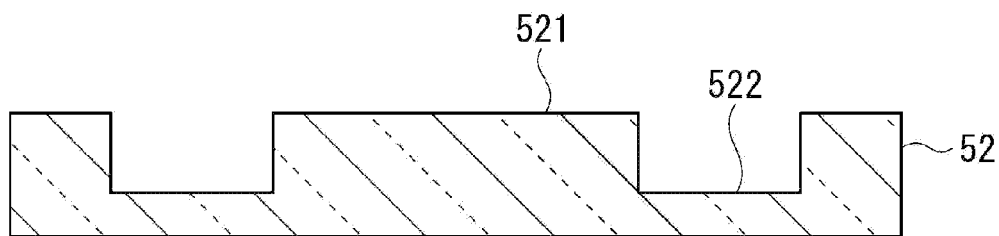

In addition, a photoresist is formed on one surface of the movable substrate 52 (the surface facing the fixed substrate 51) through a photolithographic technique, and wet etching is performed so that the movable portion 521 and the retaining portion 522 are formed as shown in FIG. 5B.

Figure 5C:
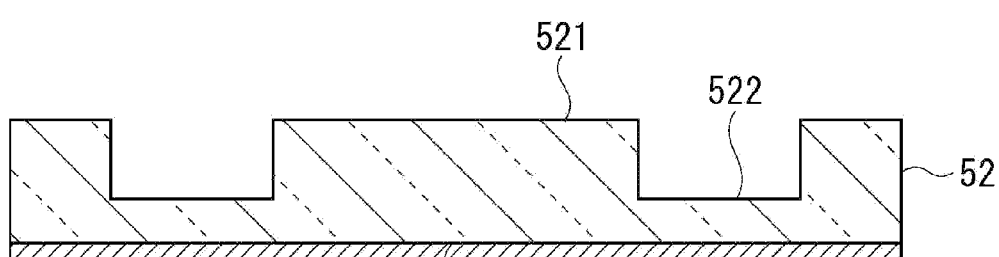
Figure 5D:
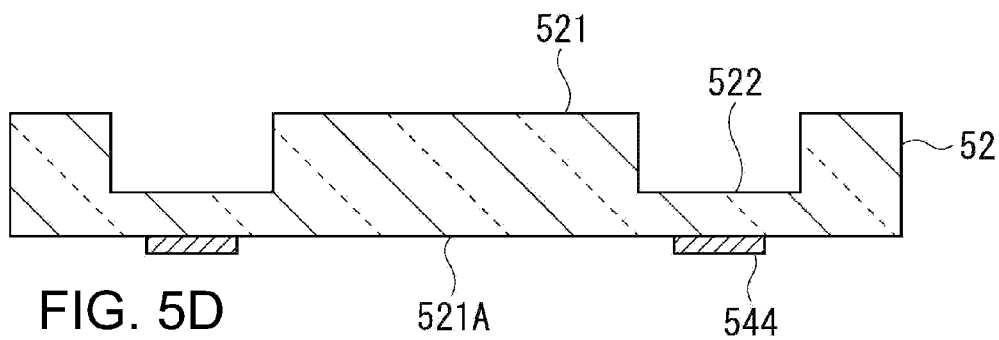

Then, as shown in FIG. 5C, an ITO film having a thickness dimension of 100 nm is formed on the surface of the movable substrate 52 facing the fixed substrate 51 through sputtering under the established film formation condition. In addition, a pattern is formed through etching to form the first electrode layer 544 as shown in FIG. 5D.

Figure 6A:
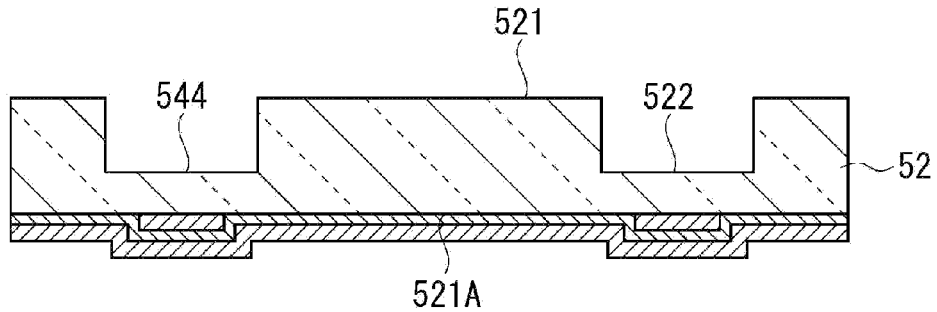
FIGS. 6A to 6D are diagrams illustrating a process of manufacturing a movable substrate of the etalon according to an embodiment of the invention.
Figure 6B:
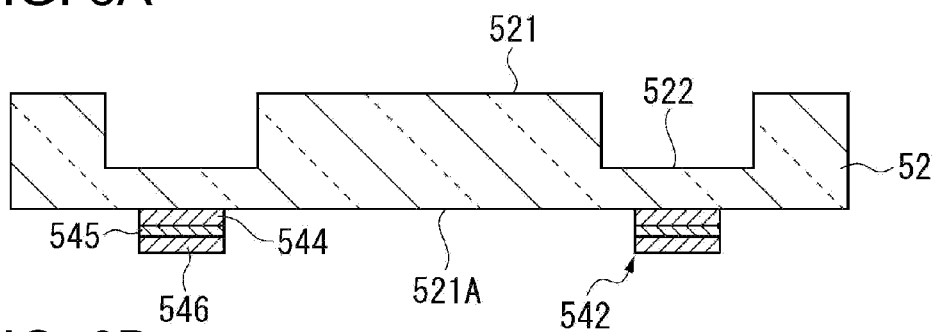

Then, as shown in FIG. 6A, a Cr film having a thickness dimension of 10 nm and an AU film having a thickness of 100 nm are formed on the surface of the movable substrate 52 facing the fixed substrate 51 through sputtering under the established film formation condition. In addition, a pattern is formed through etching so that the second electrode layer 545 and the third electrode layer 546 are formed as shown in FIG. 6B. Since each electrode layer 544, 545, and 546 of the movable electrode 542 formed as described above satisfies the condition of the Equation 2, the force F applied by the internal stress of the movable electrode 542 to the movable substrate 52 becomes zero, and bending of the movable substrate 52 is prevented.

Figure 6C:
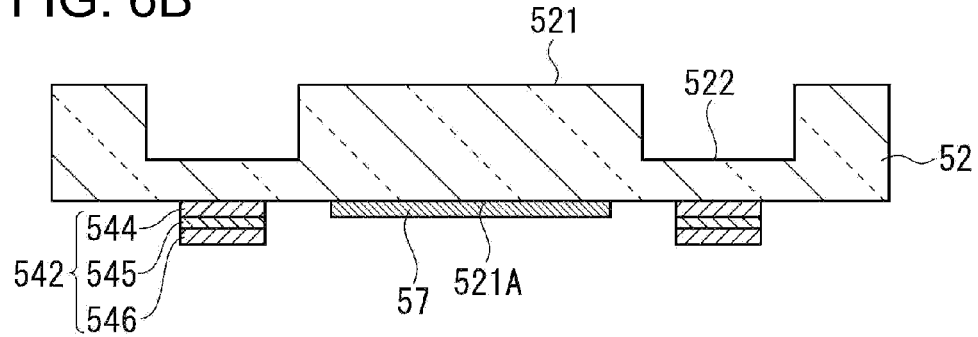

Then, similarly to the fixed reflective film 56 of the fixed substrate 51, a photolithographic technique and a lift-off process are performed so that the movable reflective film 57 is formed on the movable surface 521A of the movable portion 521 as shown in FIG. 6C.

Figure 6D:
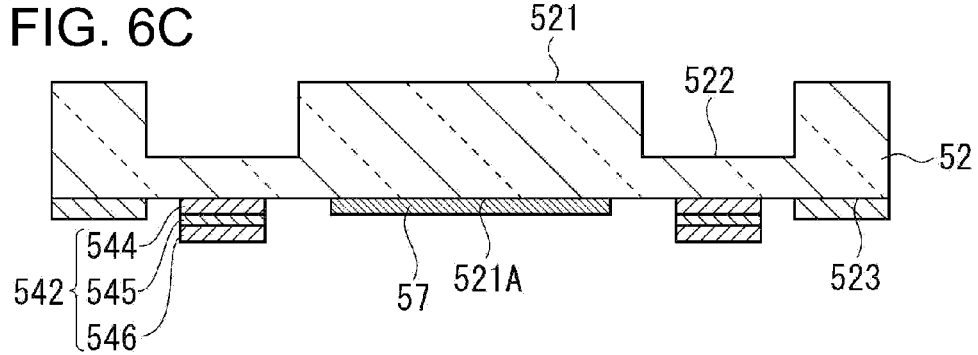

Furthermore, as shown in FIG. 6D, the plasma-polymerized film using polyorganosiloxane is formed in the bonding portion 523 of the movable substrate through a plasma CVD technique.

As a result, the movable substrate 52 having no bending caused by the internal stress of the movable electrode 542 is formed.

5-3. Bonding with Fixed Substrate and Movable Substrate

In order to bond the first substrate 51 and the movable substrate 52, first, a surface activation process is performed to activate each of the bonding portion 513 of the fixed substrate 51 and the bonding portion 523 of the movable substrate 52. In such a surface activation process, a molecular bond on the surface of the bonding portion 513 or 523 is broken and is not terminated so that a combination loss is generated.

Then, the bonding portion 513 of the fixed substrate 51 and the bonding portion 523 of the movable substrate 52 are overlapped, bonded, and pressurizedly bonded.

In this case, since there is no bending in the movable substrate 52 that may be caused by the internal stress of the movable electrode 542, there is no bending also in the movable surface 521A and the movable reflective film 57. Therefore, it is possible to maintain the fixed reflective film 56 and the movable reflective film 57 in parallel with each other, and set a desired initial gap with high precision by controlling the pressure applied during the pressurized bonding.

6. Effects of Embodiment

As described above, in the etalon 5 of the embodiment as described above, the movable electrode 542 formed on the movable substrate 52 includes first, second, and third electrode layers 544, 545, and 546, so that the first electrode layer 544 has a compressive stress, the second and third electrode layers 545 and 546 has a tensile stress. For this reasons, the force applied by the compressive stress of the first electrode layer 544 to the movable substrate 52 and the force applied by the tensile stress of the second and third electrode layers 545 and 546 to the movable substrate 52 are cancelled by each other so that the force for bending the movable substrate 52 is reduced. For this reasons, it is possible to prevent bending of the movable substrate 52 and the movable reflective film 57. Therefore, it is possible to maintain a parallel relationship between the movable reflective film 57 and the fixed reflective film 56 with high precision and improve resolution of the etalon 5.

In addition, each internal stress and each thickness dimension are set for each electrode layer 544, 545, and 546 of the movable electrode 542 based on the aforementioned Equation 2.

Therefore, the force applied by the compressive stress of the first electrode layer 544 to the movable substrate 52 and the force applied by the tensile stress of the second and third electrode layers 545 and 546 to the movable substrate 52 can be balanced with each other. Therefore, it is possible to more reliably prevent bending of the movable substrate 52 and the movable reflective film 57.

In addition, in the process of bonding the fixed substrate 51 and the movable substrate 52 during manufacturing of the etalon 5, the surface of the plasma-polymerized film is activated by illuminating ultraviolet light to the plasma-polymerized film, and the fixed substrate 51 and the movable substrate 52 are overlapped and pressurizedly bonded with a predetermined pressure along a thickness direction. In this case, for example, in a case where bending is generated in the movable substrate 52 or the movable reflective film 57 due to the internal stress of the movable reflective film 57, it is difficult to match the initial gap dimensions of the fixed reflective film 56 and the movable reflective film 57 and fit them into desired setup values. In addition, if the etalon 5 bends the movable substrate 52 by means of the electrostatic attractive force, it is difficult to set the gap equal to or larger than the initial gap. Therefore, in a case where the setup value of initial gap is erroneous, it is difficult to spectroscopically disperse a desired wavelength range of the light. Therefore, in a case where bending is generated in the movable substrate 52 or the movable reflective film 57, the resolution is degraded. Furthermore, since it is necessary to set a larger initial gap in order to manufacture the etalon 5 capable of spectroscopically dispersing a desired wavelength range of light, a drive voltage necessary to operate the movable substrate 52 using the electrostatic attractive force also increases, and thus, power consumption accordingly increases.

In contrast, in the etalon 5 according to the aforementioned embodiment, since it is possible to prevent bending of the movable substrate 52 caused by the movable electrode 542 and maintain the movable reflective film 57 and the fixed reflective film 56 in parallel as described above, the initial gap between the reflective films 56 and 57 can be constantly maintained. Therefore, it is possible to fit the gap into a desired gap dimension with high precision. In this case, since it is not necessary to set the gap equal to or larger than a desired gap dimension, it is possible to reduce a voltage value for driving the etalon 5 and reduce power consumption.

In addition, according to the present embodiment, the first electrode layer 544 is made of ITO as a metal oxide film, and the second electrode layer 545 and the third electrode layer 546 are made of Cr and Au as a metal film.

In this case, the metal oxide film serves as a film having a compressive stress without performing a special post-process when it is formed, for example, through sputtering, and the metal film serves as a film having a tensile stress without performing a special post-process when it is formed, for example, through sputtering. Therefore, it is possible to easily form the first electrode layer 544 having a compressive stress and the second and third electrode layers 545 and 546 having a tensile stress without performing a special post-process, and simplify the manufacturing process.

In addition, the movable substrate 52 is formed of glass, and the first electrode layer 544 of the movable electrode 542 being in contact with the movable substrate 52 is formed of ITO as a metal oxide film as described above.

In such a configuration, it is possible to provide excellent adhesiveness between the first electrode layer 544 and the movable substrate 52 and prevent exfoliation of the movable substrate 52.

The movable substrate 52 according to the present embodiment includes a movable portion 521 where the movable reflective film 57 is formed and a retaining portion 522 formed to have a thickness dimension smaller than that of the movable portion 52 and have weak stiffness in a thickness direction, wherein the movable electrode 542 is formed in the retaining portion 522.

As such, in a configuration having the movable portion 521 and the retaining portion 522, it is possible to move the movable portion 521 by bending the retaining portion 522 with a small drive voltage and reduce power consumption, for example, in comparison with the movable substrate having a parallel plate shape without the retaining portion 522. In addition, since the retaining portion 522 is more apt to be bent in comparison with the movable portion 521, the retaining portion 522 is significantly bent when the electrostatic attractive force is applied to the movable substrate 52, and the bending of the movable portion 521 is prevented. As a result, even when the movable substrate 52 is bent toward the fixed substrate 51, it is possible to prevent bending of the movable surface 521A of the movable portion 521 and the movable reflective film 57.

Therefore, even when the movable substrate 52 is bent toward the fixed substrate 51, it is possible to maintain a parallel relationship between the reflective films 56 and 57 with high precision and prevent reduction of resolution of the etalon 5.

In addition, in a case where the movable electrode 542 is formed in such a retaining portion 522 having weak stiffness, the retaining portion 522 is easily bent when a force to bend the retaining portion 522 is applied by the internal stress of the movable electrode 542. In contrast, according to the invention, since each of the electrode layers 544, 545, and 546 of the movable electrode 542 is formed based on the condition of the Equation 2 as described above, the force F to bend the retaining portion 522 is not applied. Therefore, it is possible to prevent bending of the retaining portion 522.

In addition, since the insulation film 543 covering the fixed electrode 541 of the fixed substrate 51 is provided, it is possible to prevent electrical discharge between the fixed electrode 541 and the movable electrode 542. For this reason, when a drive voltage is applied between the fixed electrode 541 and the movable electrode 542, electrical charges corresponding to the drive voltage are stored in each electrode 541 and 542, so that it is possible to control the gap dimension between the fixed reflective film 56 and the movable reflective film 57 with high precision.

In addition, since the fixed substrate 51 has a sufficiently large thickness dimension and is rarely bent by the internal stress of the fixed electrode 541 or the electrostatic attractive force, the fixed substrate 51 is rarely bent by the internal stress of the insulation film, and it is possible to maintain a parallel relationship between the fixed reflective film 56 and the movable reflective film 57 with high precision even when the insulation film 543 is provided as described above.

Other Embodiments

The invention is not limited to the foregoing embodiment, but includes various modifications or changes without departing from the scope of the invention.

For example, although the first electrode layer 544 is configured as a compressive electrode layer having a compressive stress, and the second and third electrode layers 545 and 546 are configured as a tensile electrode layer having a tensile stress in the foregoing embodiment, the first electrode layer 544 may be configured as a tensile electrode layer, or the second or the third electrode layer 545 or 546 may be configured as a compressive electrode layer.

It is preferable that the first electrode layer 544 be formed of ITO having excellent adhesiveness with the movable substrate 52 formed of glass. For example, the first electrode layer 544 can be formed of ITO having a tensile stress by performing annealing after the film formation through sputtering. In addition, the film formation through sputtering is apt to produce a film having a compressive stress, and the film formation through a deposition technique is apt to produce a film having a tensile stress. Therefore, the first electrode layer 544 made of ITO having a tensile stress may be formed by forming a film through a deposition technique under a predetermined deposition condition.

As such, in a case where the tensile electrode layer having a tensile stress is formed as the first electrode layer 544, at least one of the second and third electrode layers 545 and 546 is formed as a compressive electrode layer having a compressive stress. Therefore, the forces applied to the movable substrate 52 caused by the internal stresses of each electrode layer are cancelled by each other, and it is possible to reduce bending of the movable substrate 52.

Although the movable substrate 52 is used as a first substrate, and the fixed substrate 51 is used as a second substrate in the foregoing embodiment, for example, the fixed substrate 51 may be used as the first substrate, and the fixed electrode 541 may be used as the first electrode having a stack structure obtained by stacking the compressive electrode layer and the tensile electrode layer. In this case, even when the fixed substrate 51 having a thin thickness dimension is used, it is possible to prevent bending of the substrate caused by the internal stress of the fixed electrode 541.

Furthermore, the movable portions may be provided in both the fixed substrate 51 and the movable substrate 52, and each movable portion may be displaced in a thickness direction. In this case, both the fixed electrode 541 and the movable electrode 542 may have a stack structure obtained by stacking the compressive electrode layer and the tensile electrode layer.

Although a diaphragm-shaped retaining portion 522 is formed in the movable substrate 52 in the foregoing embodiment, the invention is not limited thereto.

Any other configuration may be used in the retaining portion 522 if it can allow the movable portion 521 to move back and forth with respect to the fixed substrate 51. For example, the retaining portion 522 may be configured using a plurality of bridge portions. In this case, the movable electrode 542 is formed in all of the bridge portions or the bridge portion provided in the position targeted with respect to the center of the movable substrate 52. As a result, it is possible to improve bending balance of the bridge portions and move the movable portion 521 while the movable reflective film 57 is maintained in parallel with the fixed reflective film 56.

Although a dimension between the fixed reflective film 56 and the movable reflective film 57 facing each other is smaller than a dimension between the fixed electrode 541 and the movable electrode 542 facing each other in the etalon 5 in the foregoing embodiment, the same effects as those of the present embodiment can be obtained even in an optical filter in which a dimension between the fixed reflective film and the movable reflective film is larger than a dimension between the fixed electrode and the movable electrode.

Furthermore, although the colorimetric sensor 3 is exemplified as the optical module, and the colorimetric apparatus 1 is exemplified as the optical analysis apparatus in the foregoing embodiment, the invention is not limited thereto.

For example, the optical module according to the invention may be used as a gas detection module that detects an absorption wavelength particular to a gas by receiving the light extracted by the etalon 5 as a wavelength-tunable interference filter using the detection unit, or as a gas detection apparatus that determines a type of the gas based on the absorption wavelength detected by the gas detection module as an optical analysis apparatus.

For example, the optical module may be used as an optical communication module that extracts a desired wavelength of light from the light transmitted by an optical transmission medium such as optical fiber. In addition, the optical module may be used as an optical communication apparatus that decodes data from the light extracted from such an optical communication module and extracts data transmitted using the light as an optical analysis apparatus.

Other specific structures or sequences for embodying the invention may be appropriately changed to other structures without departing from the scope of the invention.

The entire disclosure of Japanese Patent Application No. 2010-188506, filed Aug. 25, 2010 is expressly incorporated by reference herein.

What is claimed is:

1. A wavelength-tunable interference filter comprising:
   a first substrate;
   a second substrate facing the first substrate;
   a first reflective film provided on the first substrate;
   a second reflective film provided on the second substrate, the second reflective film facing the first reflective film;
   a first electrode provided on the first substrate, the first electrode provided at an outer periphery of the first reflective film; and
   a second electrode provided on the second substrate, the second electrode facing the first electrode,
   wherein the first electrode is configured by stacking a first electrode layer, a second electrode layer and a third electrode layer in series,
   the first electrode layer has a first in-plane internal stress which is compressive, the first electrode layer is a metal oxide film and conductive,
   the second electrode layer has a second in-plane internal stress which is tensile, the second electrode layer is a metal film, and
   the third electrode layer has a third in-plane internal stress which is tensile, the third electrode layer is a metal film which is different from the second electrode layer.

2. The wavelength-tunable interference filter according to claim 1, wherein an absolute value of a product between the film thickness dimension of the first electrode layer and the first in-plane internal stress is equal to an absolute value of a product between the film thickness dimensions of the second and third electrode layers and the second and third in-plane internal stresses.

3. The wavelength-tunable interference filter according to claim 1, wherein the first substrate is formed of glass, and
   the first electrode layer is in contact with the first substrate.

4. The wavelength-tunable interference filter according to claim 1,
   wherein the first substrate includes:
   a movable portion provided with the first reflective film, and
   a retaining portion that retains the movable portion so as to move back and forth with respect to the second substrate,
   wherein the retaining portion has stiffness in a thickness direction weaker than that of the movable portion, and
   wherein the first electrode is provided in the retaining portion.

5. The wavelength-tunable interference filter according to claim 1, wherein the second substrate is a fixed substrate that is not deformed by an electrostatic attractive force generated by applying a voltage to the first electrode and the second electrode, and
   an insulation film covers a surface of the second electrode.

6. An optical module comprising:
   the wavelength-tunable interference filter according to claim 1; and
   a detection unit that detects light transmitting through the wavelength-tunable interference filter.

7. An optical module comprising:
   the wavelength-tunable interference filter according to claim 2; and
   a detection unit that detects light transmitting through the wavelength-tunable interference filter.

8. An optical module comprising:
   the wavelength-tunable interference filter according to claim 3; and
   a detection unit that detects light transmitting through the wavelength-tunable interference filter.

9. An optical module comprising:
   the wavelength-tunable interference filter according to claim 4; and
   a detection unit that detects light transmitting through the wavelength-tunable interference filter.

10. An optical module comprising:
    the wavelength-tunable interference filter according to claim 5; and
    a detection unit that detects light transmitting through the wavelength-tunable interference filter.

11. An optical analysis apparatus comprising:
    the optical module according to claim 6; and
    an analysis processing unit that analyzes an optical property of light detected by the detection unit of the optical module.

12. An optical analysis apparatus comprising:
    the optical module according to claim 7; and
    an analysis processing unit that analyzes an optical property of light detected by the detection unit of the optical module.

13. An optical analysis apparatus comprising:
    the optical module according to claim 8; and
    an analysis processing unit that analyzes an optical property of light detected by the detection unit of the optical module.

14. An optical analysis apparatus comprising:
    the optical module according to claim 9; and an analysis processing unit that analyzes an optical property of light detected by the detection unit of the optical module.

15. An optical analysis apparatus comprising:
the optical module according to claim 10; and
an analysis processing unit that analyzes an optical property of light detected by the detection unit of the optical module.

16. A wavelength-tunable interference filter comprising:
a substrate;
a first reflective film provided on the substrate;
a second reflective film facing the first reflective film;
a first electrode provided on the substrate, the first electrode provided at an outer periphery of the first reflective film; and
a second electrode facing the first electrode, wherein
a top surface of the second reflective film is located relatively higher than a top surface of the second electrode in a direction extending from the second reflective film to the first reflective film,
the first electrode is configured by stacking a first electrode layer, a second electrode layer and a third electrode layer in series,
the first electrode layer has a first in-plane internal stress which is compressive, the first electrode layer is a metal oxide film and conductive,
the second electrode layer has a second in-plane internal stress which is tensile, the second electrode layer is a metal film, and
the third electrode layer has a third in-plane internal stress which is tensile, the third electrode layer is a metal film which is different from the second electrode layer.

17. A wavelength-tunable interference filter comprising:
a first substrate;
a second substrate facing the first substrate;
a first reflective film provided on the first substrate;
a second reflective film provided on the second substrate, the second reflective film facing the first reflective film;
a first electrode provided on the first substrate, the first electrode provided at an outer periphery of the first reflective film; and
a second electrode provided on the second substrate, the second electrode facing the first electrode, wherein
the first substrate is movable when a voltage is applied to the first and second electrodes,
the first electrode is laterally spaced apart from the first reflective film in a plan view,
the first electrode is configured by stacking a first electrode layer, a second electrode layer and a third electrode layer in series,
the first electrode layer has an in-plane internal stress which is compressive,
the second and third electrode layers have in-plane internal stresses which are tensile, and
the first electrode is configured to resist bending of the first substrate while the voltage is not applied to the first and second electrodes and to keep the first and second reflective films in a parallel state during and after movement of the first substrate.

18. The wavelength-tunable interference filter according to claim 17, wherein
an absolute value of a product between a film thickness of the first electrode layer and the in-plane internal stress of the first electrode layer is equal to an absolute value of a product between film thicknesses of the second and third electrode layers and the in-plane stresses of the second and third electrode layers.

19. The wavelength-tunable interference filter according to claim 17, wherein
the first substrate includes:
a movable portion provided with the first reflective film, and
a retaining portion that retains the movable portion so as to move back and forth with respect to the second substrate, wherein
the retaining portion has stiffness in a thickness direction weaker than that of the movable portion, and
the first electrode is provided in the retaining portion.

20. The wavelength-tunable interference filter according to claim 17, wherein
the second substrate is a fixed substrate that is not deformed by an electrostatic attractive force generated by applying the voltage to the first electrode and the second electrode, and
an insulation film covers a surface of the second electrode.

21. The wavelength-tunable interference filter according to claim 1, wherein
the second electrode layer has an adhesion property with respect to the first and third electrode layers.

22. The wavelength-tunable interference filter according to claim 1, wherein
the first electrode layer is made of indium tin oxide,
the second electrode layer is made of chromium, and
the third electrode layer is made of gold.

23. The wavelength-tunable interference filter according to claim 16, wherein
the second electrode layer has an adhesion property with respect to the first and third electrode layers.

24. The wavelength-tunable interference filter according to claim 16, wherein
the first electrode layer is made of indium tin oxide,
the second electrode layer is made of chromium, and
the third electrode layer is made of gold.

25. The wavelength-tunable interference filter according to claim 17, wherein
the second electrode layer has an adhesion property with respect to the first and third electrode layers.

26. The wavelength-tunable interference filter according to claim 17, wherein
the first electrode layer is made of indium tin oxide,
the second electrode layer is made of chromium, and
the third electrode layer is made of gold.

* * * * *